United States Patent [19]

Spiel et al.

[11] Patent Number: 4,873,096

[45] Date of Patent: Oct. 10, 1989

[54] SIMULATED EGG TREATS FOR PETS

[75] Inventors: Albert A. Spiel, Yonkers, N.Y.; James Roe, Wayne; Henry C. Spanier, West Milford, both of N.J.

[73] Assignee: Nabisco Brands, Inc., East Hanover, N.J.

[21] Appl. No.: 235,059

[22] Filed: Aug. 23, 1988

Related U.S. Application Data

[63] Continuation of Ser. No. 000,431, Jan. 5, 1987, Pat. No. 4,795,655, which is a continuation-in-part of Ser. No. 578,040, Feb. 2, 1986, Pat. No. 4,634,597, and a continuation-in-part of Ser. No. 898,187, Aug. 20, 1986, Pat. No. 4,711,425.

[51] Int. Cl.⁴ ................................................. A23K 1/00
[52] U.S. Cl. ........................................... 426/72; 426/74; 426/94; 426/283; 426/512; 426/635; 426/523; 426/558; 426/805
[58] Field of Search ............... 426/94, 635, 280, 282, 426/283, 549, 657, 641, 512, 523, 72, 74, 805, 558

[56] References Cited

U.S. PATENT DOCUMENTS

| | | |
|---|---|---|
| 291,740 | 9/1987 | Spiel et al. |
| 982,711 | 1/1911 | Ellis |
| 1,929,906 | 10/1933 | Skokowski .......................... 426/272 |
| 3,851,571 | 12/1974 | Nichols .......................... 426/112 X |
| 4,139,644 | 2/1979 | Stephenson ....................... 426/134 |
| 4,362,761 | 12/1982 | Chang et al. ................... 426/573 X |
| 4,426,400 | 1/1984 | Newlin et al. ..................... 426/514 |
| 4,634,597 | 1/1987 | Spiel et al. ........................ 426/635 |
| 4,702,926 | 10/1987 | Fowler ................................ 426/283 |
| 4,795,655 | 1/1989 | Spiel et al. ........................ 426/635 |

OTHER PUBLICATIONS

"COME'N GET IT" dog food ad published in *Better Homes and Gardens*-Feb. 1981.

Gaines dog food ad published in the Washington *Sunday Star*-Dec. 1955.

*Primary Examiner*—R. B. Penland
*Attorney, Agent, or Firm*—Richard Kornutik

[57] ABSTRACT

Baked goods comprising a base portion and a filling or upper portion are prepared by applying the filling or upper portion dough to the base portion so that the filling or dough penetrates grooves in the dough of the base portion. The filling or upper portion is baked in place to cause the two portions to adhere and bond together. In an embodiment, a pet egg treat has the general shape of a longitudinal or transverse slice of hard-boiled egg. The yolk portion contains real egg yolk solids, while the outer egg-shaped portion contains flour, egg solids and any type of nutritious meal, including meat meal, fish meal, oat meal, or the like. Flavorings, as well as vitamins, coloring agents, and minerals can be included. The treat is hard and helps to clean pets' teeth and gums, and provides chewing exercise for pets. The treat preferably has a round- or oval-shaped base portion having a light coloring to simulate the egg white portion of a hard-boiled egg, with the filling simulating the color and shape of the yolk, so that the product has the appearance of a slice of a hard-boiled egg.

15 Claims, 3 Drawing Sheets

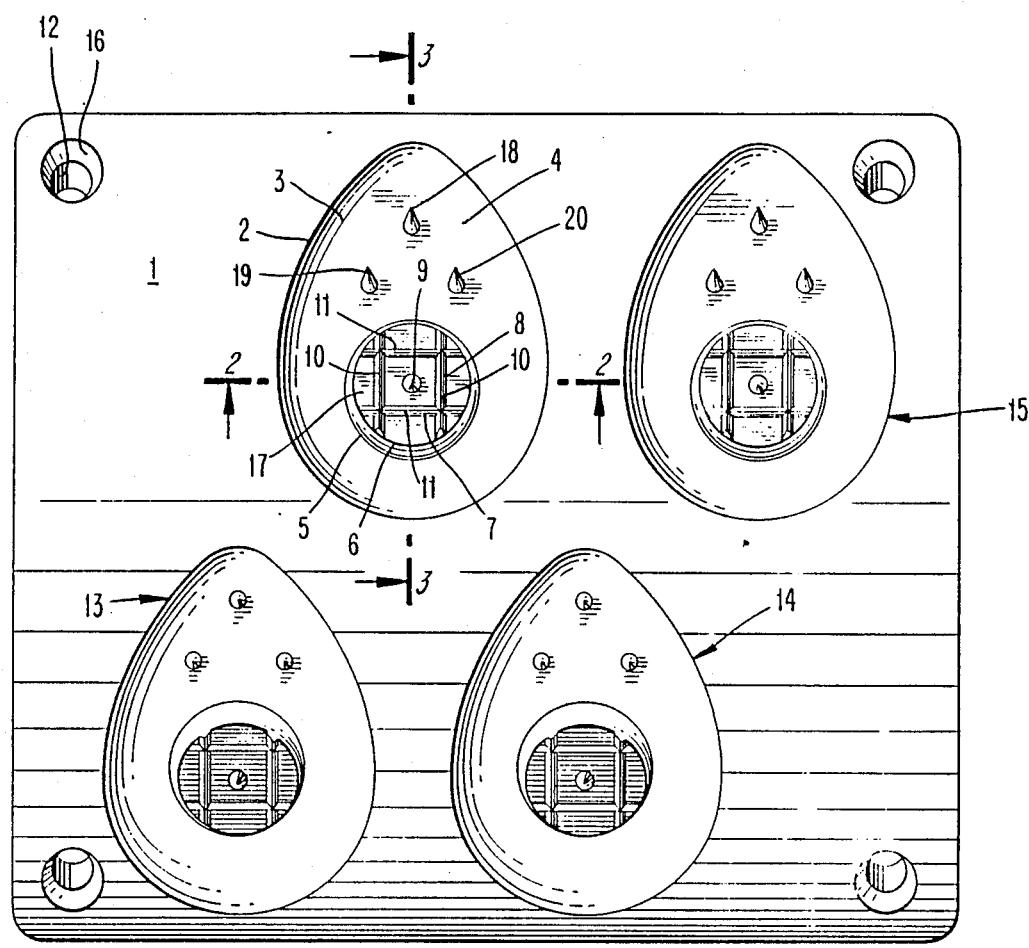
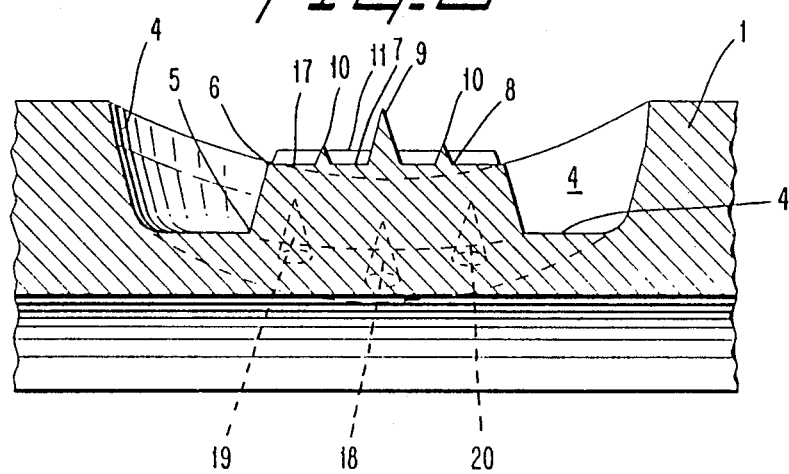

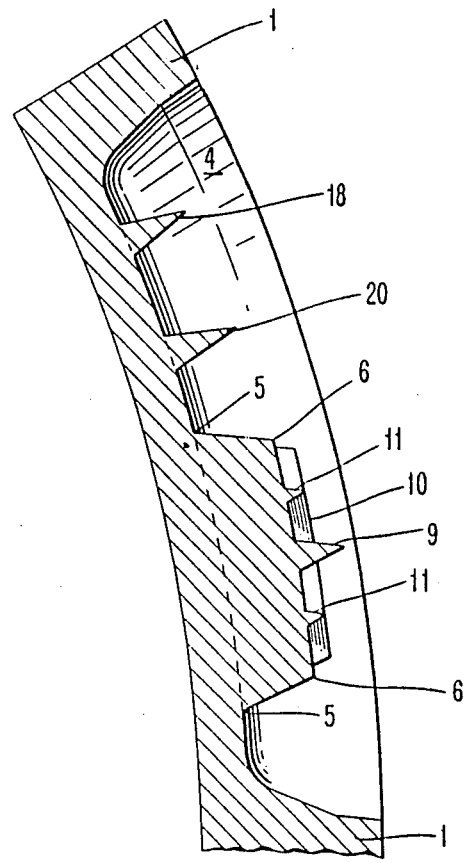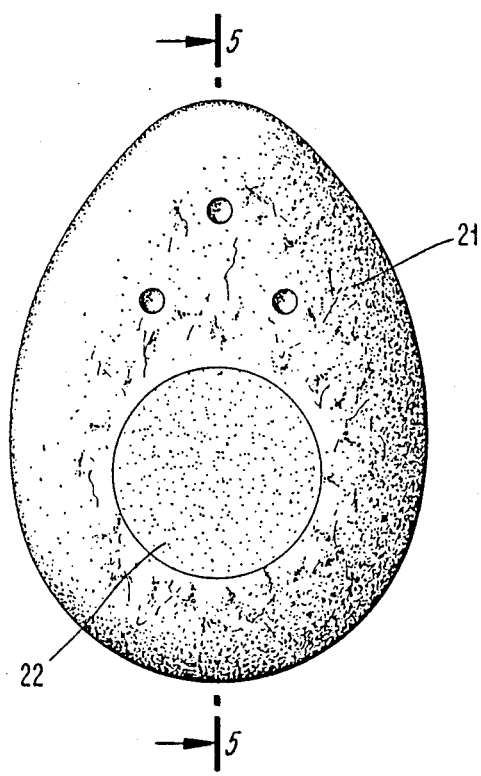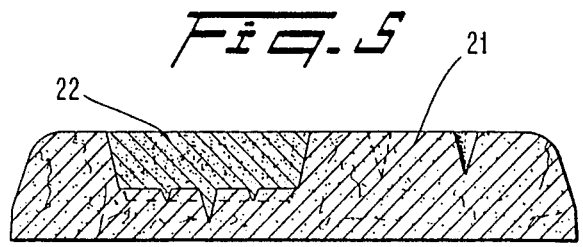

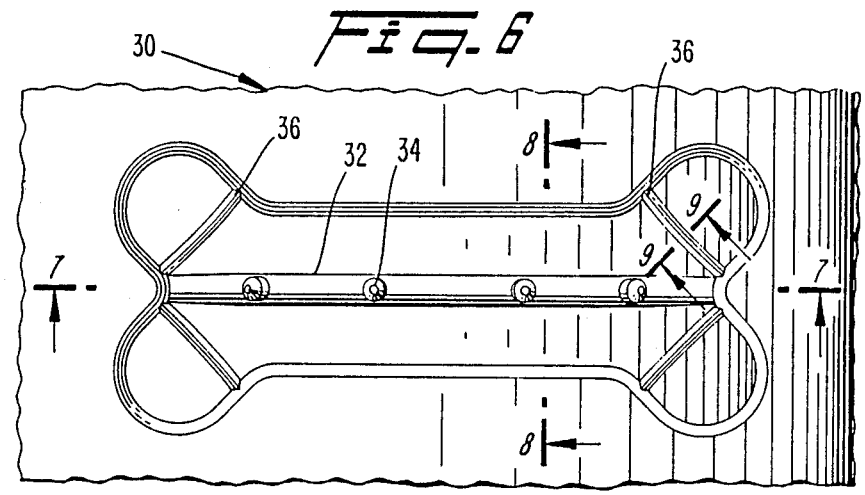
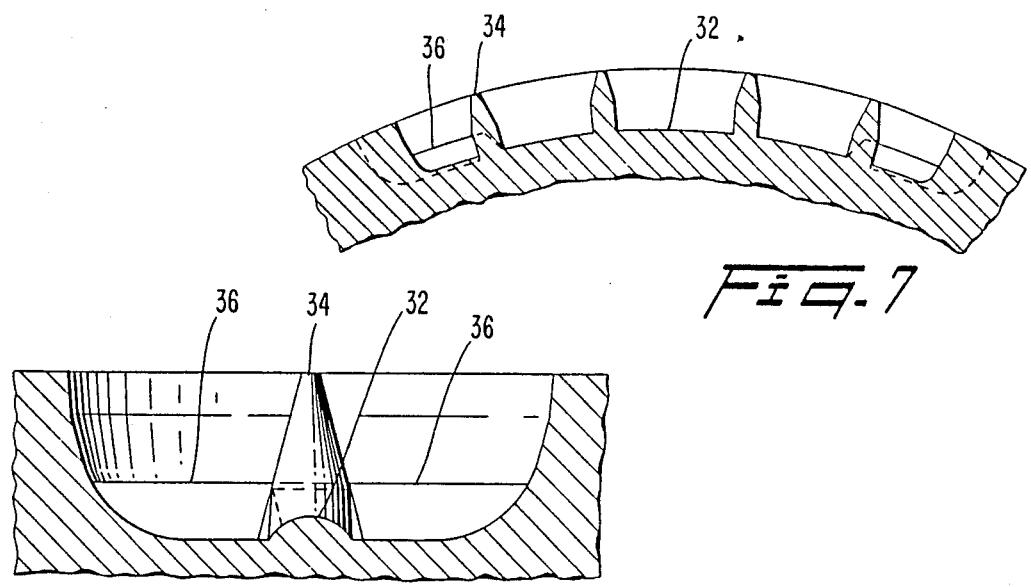
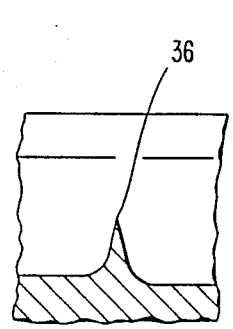
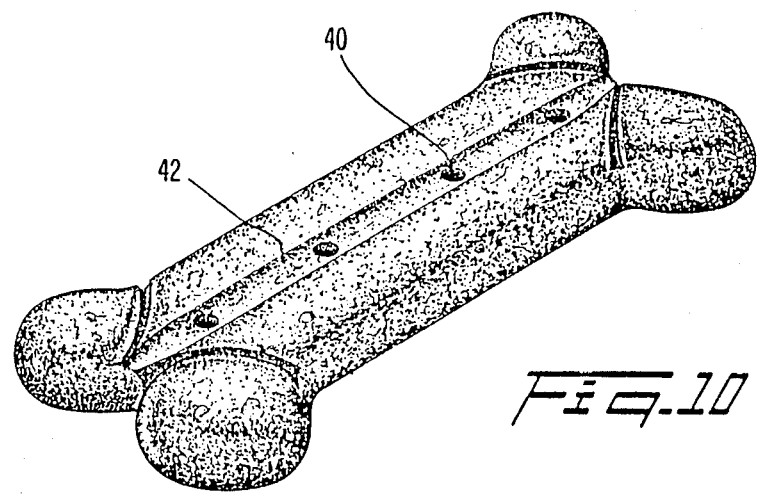

SIMULATED EGG TREATS FOR PETS

REFERENCE TO RELATED APPLICATIONS

This application is a continuation of co-pending U.S. patent application Ser. No. 00,431 filed Jan. 5, 1987, now U.S. Pat. No. 4,795,655 which is a continuation-in-part of co-pending U.S. patent application Ser. No. 578,040, filed Feb. 2, 1984 now U.S. Pat. No. 4,634,597, and co-pending U.S. patent application Ser. No. 898,187, filed on Aug. 20, 1986 now U.S. Pat. No. 4,711,425.

BACKGROUND OF THE INVENTION

1. Field of the Invention

This invention relates to baked food products such as treats for pets and snacks for human consumption.

2. Description of the Prior Art

It is well-known that certain pets, such as dogs and cats, crave eggs. The incorporation of eggs or an egg flavor component into pet food is also well-known as exemplified by the following U.S. Patents.

U.S. Pat. No. 3,808,341 (Rongey) teaches a pet food product having the appearance, flavor and aroma of cooked eggs. An egg base coating encases a less palatable core to mask its taste and appearance. The core is generally formed of materials such as starch containing cereal and ground meat or fish. This product is not used as a treat, but instead is employed as a meal for pets.

U.S. Pat. No. 4,046,922 (Burkwall, Jr.) teaches a cooked pet food product which simulates a natural fried egg and has the form of a rounded disk with a white outer portion and inner yellow portion. It is produced by coextrusion and contains 20 percent to 40 percent by weight moisture.

U.S. Pat. No. 3,916,029 (Hildebolt) teaches a pet food containing a semi-moist inner matrix including a small percentage of whole eggs within an in situ baked outer pastry shell. The inner portion is precooked, ground up and coextruded with the outer portion.

U.S. Pat. Nos. 3,889,607 and 4,032,665 (both assigned to Ralston Purina Co.) teach simulated bone pet foods which are formed by depressing the material in the shape of a rounded bone cross-section with hollow interior followed by stuffing brownish, farinaceous material into the hollow to resemble bone marrow. The claimed process requires shaping the dough at 100° to 220° F. wherein a simulated bone having a shear value of not less than 250 lbs. per square inch results.

None of the above-described prior art references teach the production of a pet treat by depositing a yolk portion containing egg protein onto a base portion containing meat or meat by-products and simultaneously baking both portions to bond them into a hard biscuit.

BROAD DESCRIPTION OF THE INVENTION

In accordance with the invention, a method of making a baked product having a base portion and another upper portion bonded thereto is provided, comprising the steps of:

a. preblending dry ingredients of a base portion comprising 40 to 50 weight percent of flour, 10 to 20 weight percent meal and 0 to 15 weight percent of egg solids;

b. adding water to the blended ingredients and mixing to form a dough;

c. separately preblending dry ingredients of a filling or upper portion including 15 to 25 weight percent of flour, 4 to 8 weight percent of meal, 2 to 18 weight percent of a sugar and 5 to 20 weight percent of a heat-coagulable protein or gelatinizing component, adding 30 to 40 weight percent of water and mixing to form a filling or dough;

d. forming the base portion dough into a predetermined shape having a substantially planar upper surface therein, containing at least one groove for receiving the filling or upper portion dough;

e. depositing the filling or upper portion into the grooves to form a dough piece having two portions; and f. baking the dough piece at a temperature in a range of about 200° to 600° F. to form a baked product in which the base portion and the filling or upper portion adhere and bond together, and subsequently drying the baked product until the final moisture content of the product is less than about 15 weight percent.

In this method, the filling or upper portion after being deposited into the groove or grooves spreads into the grooves during baking and then interlocks with the grooves during the subsequent baking to perform a relatively strong bond between the filling and the upper portion and the base portion. The baking step takes place at a sufficiently low temperature and a sufficiently short residence time in the baking oven so that the filling or upper portion does not prematurely set before it has time to flow and substantially fill the grooves to provide a relatively strong bond between the baked base portion and upper portion. In other words, when the product is baked, the filling first softens and flows to substantially fill the grooves, then bakes to a firm texture within the grooves to adhere and bond to the base portion. By a relatively strong bond, it is meant that the filling adheres to the base portion with a tensile strength at least equivalent to that of the baked base portion itself. The base portions are preferably formed by a rotary molder which produces a predetermined shape having a substantially planar lower surface and a substantially parallel, planar upper surface, with the predetermined shape of the base portions preferably being related to the contents or flavor of the product.

Further in accordance with the invention, baked products prepared in accordance with the process of the present invention are provided, and particularly baked products having a base portion and a smaller upper portion bonded thereto, prepared by the steps of:

a. Preblending dry ingredients of a base portion comprising from 40 to 50 weight percent of flour, from 10 to 20 weight percent of meal, and from 0 to 15 weight percent of egg solids;

b. adding water to the blended ingredients and mixing to form a dough;

c. separately preblending dry ingredients of a filling or upper portion including from 15 to 25 weight percent of flour, from 4 to 8 weight percent of meal, from 2 to 18 weight percent of a sugar and from 5 to 20 percent of a heat-coagulable protein or gelatinizing component, adding from 30 to 40 weight percent of water and mixing to form a filling or dough;

d. forming the base portion dough to a predetermined shape having a substantially planar upper surface therein, containing at least one groove for receiving the filling or upper portion dough;

e. depositing the filling or upper portion into the groove in the base portion to form a dough piece having two portions; and f. baking the dough piece at a temperature in the range of 200° to 600° F. to form a baked product in which the base portion and the filling or upper portion adhere and bond together; and g. subsequently drying the baked product to a final moisture content of less than about 15 weight percent.

Still further in accordance with the invention, baked products are provided comprising a base portion formed from a dough comprising flour, meal and at least one flavor and an upper portion or filling adhered and bonded thereto, the upper portion or filling comprising flour, a sugar, at least one flavor and a heat-coagulable protein or gelatinizing component, wherein at least a portion of the upper portion or filling has been baked into a groove or indentation in the upper surface of the base portion to adhere and bond the portions together.

Further in accordance with the invention, a mold is provided for use in a rotary molder for dough, comprising an arcuate surface having a plurality of depressions formed therein. Each of the depressions are bounded by a perimeter which forms the outline of a foodstuff such as an egg or the like, and have at least one generally arcuate surface forming the bottom of each depression. At least one of these arcuate surfaces in each depression has at least one raised ridge thereon, each of the ridges lying entirely within the depressions and adapted to form corresponding grooves in a dough which is received in the depressions of the mold. Thus, the dough passing beneath the mold of the rotary molder is received by the depressions so as to be shaped thereby into a biscuit shape having the outline of the foodstuff described and having at least one groove in the upper surface therefor. The depressions of the mold units can be formed in a plurality of curved plates adapted for attachment to, and use in, a rotary molder, or formed directly in the solid rotor of a rotary molder, which is preferred for production purposes. A relatively simple example of a product which can be molded thereby is a bone-shaped dog biscuit having at least one longitudinal groove therein, as shown in FIG. 10 herein. A typical example of such a bone-shaped dog biscuit, albeit without the longitudinal groove, is the MilkBone ® biscuit produced and sold by Nabisco Brands, Inc.

In a preferred embodiment, each of the mold depressions contains a generally arcuate surface elevated above the surrounding area of the arcute surface forming the bottoms of the depressions and having at least one raised ridge thereon. The elevated surface is adapted to form a depression with at least one groove in the bottom surface thereof in dough which is received in the depressions of the mold. In one embodiment, the mold forms a product in the shape of a longitudinal or transverse cross-section of an egg, with the elevated portion within the depression of the mold forming a round depression in the dough for receiving a filling representing the yolk of the egg, with grooves at the bottom to receive the filling when injected.

In an embodiment, the present invention is directed to a pet treat which incorporates a simulated appearance, flavor and aroma of cooked eggs, with a meat or meat by-products portion.

In a preferred embodiment, the baked product is a dry, hard pet egg treat biscuit having a base egg white portion and upper egg yolk portion wherein the base egg white portion is formed of a dough comprising 40 to 50 weight percent of flour, 10 to 20 weight percent of meal and from 10 to 15 weight percent of egg solids; the egg yolk proportion comprises from 15 to 25 weight percent of flour, 4 to 8 weight percent of meal, from 12 to 18 weight percent of a sugar and from 15 to 20 weight percent egg solids as the heat-coagulable protein. The base portion is formed into a predetermined shape by means of a rotary molder, producing a substantially planar lower surface and a substantially planar upper surface having an indentation therein, with the indentation having a substantially planar lower surface therein containing a plurality of grooves into which the upper egg yolk is deposited. The molded and filled product is baked so that the base egg white portion and the egg yolk portion adhere and bond together.

Further details and advantages of the present invention appear from the following description of preferred embodiment shown schematically in the drawings.

BRIEF DESCRIPTION OF THE DRAWINGS

In the drawings:

FIG. 1 is a top elevational view of a mold according to the invention;

FIG. 2 is a side sectional view taken along line 2—2 of FIG. 1;

FIG. 3 is a view in section taken along line 2—2 of FIG. 1;

FIG. 4 is a top elevational view of an egg treat product according to the invention;

FIG. 5 is a side section view taken along line 5—5 of FIG. 4.

FIG. 6 is a top elevational view of another mold according to the invention for the production of grooved dog bone products;

FIG. 7 is a side sectional view taken along line 7—7 of FIG. 6;

FIG. 8 is a view in section taken along line 8—8 FIG. 6;

FIG. 9 is a view in section taken along line 9—9 of FIG. 6; and

FIG. 10 is a perspective view of a grooved dog bone product according to the present invention.

DETAILED DESCRIPTION OF THE INVENTION

The present invention includes processes for preparing baked goods with two sections, or a base portion and a filling, baked in place so that they adhere and bond together, and the diverse products of such processes. While the invention will be described primarily in terms of a dry, hard, pet egg treat, this should not be considered as limiting, for the processes can be used in the production of many different types of products which include features of the invention. For example, the dough for the base portion of the baked product can be a conventional dough for dog biscuits, optionally containing discrete particles of meat and/or meat by-products. Such doughs typically contain fat solids. Suitable doughs for the production of hard biscuits are disclosed in U.S. Pat. No. 4,454,163, and suitable doughs for the production of soft biscuits (containing a humectant) are disclosed in U.S. Pat. No. 4,454,164. Both patents are incorporated herein by reference in their entirety.

In one embodiment of the invention both the base portion and the egg yolk portion are integrated into a single product and are baked, which causes adhesion and bonding of the egg yolk portion to the base portion. The base portion is formed with an indentation on one surface. The yolk portion is applied in fluid form by extruding or depositing the yolk portion into the indented portion. Both the egg yolk portion and the base portion are hard. Because the yolk portion is hard, solid fats do not leach or bleed after baking. Baking the product with low heat is essential because high temperature heat could prematurely set the product before sufficient bonding has occurred.

The dry, hard pet treat of the invention comprises 2 portions shaped similarly to the cross-section of a hard-boiled egg wherein yellow yolk portion 22 is surrounded by a bone white or light brown meat and/or meat by-product portion which is referred to hereunder as egg white portion 21. The pet treats are microbiologically stable and can be stored without refrigeration or special packaging for periods up to at least 12 months, up to 18 months. The preferred shape is that of a longitudinal or lateral cross-section of a hard-boiled egg but other shapes such as round, animal-shaped, or steak-like (steak and eggs) are also contemplated and are within the scope of the invention. Preferably, the shape of the product is related to the contents and/or flavor of the base and/or filling portions. In a preferred embodiment, a thickness of approximately ½ inch is used and is typical for this and other pet treats.

The long shelf life is attributable to a moisture content of less than about 15 percent, preferably less than 14 percent, and most preferably from 8 to 12 percent, and a water activity in a range well-recognized and conventionally known for stability, usually in the range of, or below, 0.65 to 0.70 (water activity being defined as the ratio of partial pressure of $H_2O$ in the product, to the partial pressure of $H_2O$ at standard laboratory conditions). The high viscosity of the unbaked filling or upper portion (i.e., a consistency similar to peanut butter) has the added desired effect of preventing bleeding from filling to the base portion because water or other liquids do not work into any capillary cracks. Higher moisture and water activity levels than those set forth in the invention could cause bleeding or smearing of the yolk portion into the meat-containing, or meat-by-product containing, surrounding area during extrusion, cutting, curing, and baking of the compositions employed in the present invention. Hardness reduction is caused by the formation of steam pockets which convert into air pockets when the pet treat is baked.

The following description uses the word "meal." The meal can be any one or more of the following plant or animal meals including, but not limited to, soybean meal, wheat meal, meat and bone meal, fish meal, poultry meal, oat meal, rye meal, corn meal, rice meal and barley meal.

The stability of the pet treat is achieved through a low water activity of the range well recognized for stability, which is generally in the range of 0.65 to 0.70 or less. This low water activity is achieved by dehydration or the use of humectants known to those skilled in the art such as glycerin, propylene glycol, salt, corn syrup, sugar and the like.

The meat and/or by-product containing the base portion of the invention, i.e., the egg white portion in the pet treat, can contain from about 40 to 50 percent by weight of flour; about 10 to 20 percent of meal; about 2.5 to 3.5 percent of flavoring, vitamin and mineral preblends and preservatives, from 0 to about 15 percent (from 0.1 to 15 percent, when present) of egg solids; and 25 to 30 percent water, and preferably contains: from about 40 to 50 percent by weight of flour; about 10 to 15 percent of meal; about 2.5 to 3.5 percent of flavoring, vitamin and mineral preblends and preservatives, 10 to 15 percent of egg solids; and 25 to 30 percent water, based upon the total ingredients of the base portion. The filling or upper portion dough of the invention can contain about 15 to 25 weight percent of flour, about 4 to 8 weight percent of meal, about 2 to 18 weight percent of a sugar, about 5 to 20 weight percent of a heat-coagulable protein or gelatinizing component and 30 to 40 weight percent of water. The preferred yolk filling of the invention contains: about 15 to 25 percent of flour; 4 to 8 percent of meal; 3 to 5 percent flavoring, mineral and vitamin premix; 1 to 2 percent coloring agents and preservatives; 12 to 18 percent sugar; 15 to 20 percent of a heat-coagulable protein such as egg solids or a gelatinizing component; and 30 to 40 percent of water, all based upon the total ingredients of the filling. The meat or meat byproduct-containing portion comprises 90 to 95 percent by weight of the entire egg treat (shown in FIGS. 4 and 5) before baking. The baked weight of the pet treat is approximately 70 to 80 percent of the weight of the egg treat before baking.

The dry ingredients can be blended together in any typical mixer such as a ribbon blender, rotary blade mixer or Hobart type mixer until a substantially homogeneous composition is achieved. The water is then added to produce a stiff dough which can be extruded through a die to form the base portion. The consistency of the dough should be neither sticky nor dry and suitable for either extrusion or molding as desired. All mixing can be performed at a suitable speed such as 20 to 100 rpm of the blades.

The dry blending is typically at room temperature and atmospheric pressure for a period of about 3 to 10 minutes, but any amount of time may be used to blend the ingredients. The water can be hot tap water having a temperature of approximately 90° to 150° F. Nonetheless, any lukewarm, to very hot, to boiling water may be used if such is available. After the hot water has been added, additional mixing of 3 to 5 minutes is necessary to form the stiff dough, although this can vary greatly depending upon how the dough is mixed. Generally, the base or the egg white portion can be extruded and an indentation is formed on the top surface thereof. This is not the preferred method of making the egg white portion, however, since the extruded product must be sliced, as by a wire slicer. Slicing causes warping, bending, and other types of distortion of the egg white portion, which is not rectified by settling of the egg white portion since the dough of the egg white portion is too stiff or viscous to settle flat without application of an additional external force. Warped egg white portions are not as attractive as flat egg white portions, nor are they as amenable to addition of the yolk portion in an automated production process. However, in a preferred method of forming, the egg white portion dough can be rolled flat and cut into an egg shape by a rotary cutter as described hereunder.

In preparing yolk portion 22, the dry ingredients are generally blended for approximately the same length of time as the egg white portion dry ingredients in order to achieve substantial uniformity. Again, however, any suitable amount of time can be used for blending, depending on the mixer, the speed of operation, and the amount and quality of the materials to be blended. Then cold tap water of about 40° to 80° F. is added and additional mixing for about 3 to 5 minutes yields a peanut butter type consistency of product having a yellow coloring. Any available cold tap water will suffice. This filling is preferably placed into an ejector or extruder and forced outwardly through a die or nozzle into the indented portion of the base of the pet treat; but any suitable application method can be used.

The pet treats or other products are baked to achieve a shelf stable product without the need for a moisture barrier protector. Typical baking temperatures are from about 200° to 325° F. for approximately 12 to 25 minutes in a forced air dryer. On a weight basis, the final product is approximately 70 to 80 percent of the weight of the prebaked product. This results from evaporation of the water during baking. The final moisture content should be less than 15 weight percent, preferably less than 14 weight percent, and most preferably about 8 to 12 weight percent.

Referring now to the Figures, the process and products of the present invention are described with reference to the non-limiting example of a preferred embodiment, the pet egg treat. FIG. 1 is a top elevational view of a mold element showing mold element 1 for producing egg white portions 21 using a conventional rotary cutter (not shown). In a rotary cutter, a large cylindrical support or rotor, having molds fixed thereto, is rotated in place in contact with a moving flat sheet of dough. A support is under the moving dough. Pressure between the molds and the dough support forces the dough to fill the mold. In accordance with the invention, the molds are designed to impress at least one groove or depression in the molded base portion to receive the filling when applied. The groove(s) can be imprinted in a flush surface of the base portion or in a recessed portion configured to receive the filling. A single groove, e.g., a longitudinal groove in a molded bone-shaped dog biscuit, can be used but preferably a plurality of grooves are used to receive the filling, which then adheres and bonds to the base portion during baking.

Four egg white mold patterns 2, 13, 14, 15 are formed in mold element 1. As shown in section in FIGS. 2 and 3, the pattern shown is formed in depressions 4 in the mold surface. Two pairs of intersecting ridges 10, 11 are raised above elevated die surface 7. Raised die surface 7 is used to form an indentation in egg white dough 21 for egg yolk portion 22 (both shown in FIGS. 4 and 5). Raised ridges 10, 11 are used to form corresponding depressions in egg white dough 21. Yolk portion 22, when injected into the depression formed by surface 7 in egg white portion 21, spreads into the depressions formed by ridges 10, 11 of the mold element so as to increase the strength of the bond between egg yolk portion 22 and egg white portion 21. This advantageously improves the quality of the final product to the consumer.

Projections or dockering pins 9, 18, 19, 20 are formed above the depression 4 in each mold. Each projection is spike-like. None of the projections extend above the level of the top of the surrounding body 1. Projection 9 extends above the flat raised surface 17 to a point close to the top of the surrounding body 1. Projection 9, although shown as centrally located on raised surface 17, can be located anywhere on raised surface 17 or could be omitted entirely. Projections 18 to 20 extend above level 5 of the raised portion 7, and are spaced away from raised portion 17 along the bottom surface of depression 4.

Raised surface 17 is bounded by edge 6. The lower portion or base of ridge 7 is designated by the numeral 5 in FIGS. 1 to 3.

The base portions of raised ridges 11 are designated in the drawings as base 7. The base portions of raised ridges 10 are designated as base 8. The outermost edge of depression 4 is denoted by juncture 2 which is the intersection of the generally smooth curve of the top surface of body 1 with the upwardly extending walls of depression 4. The base of the depression wall is indicated in FIG. 1 as numeral 3; the upwardly sloping sidewall between sidewall base 3 and junction 2 is angled outward to permit ease of removal of dough 21 from depression 4 during operation of the rotary cutter. Projections 9 and 18 to 20 similarly are provided for aiding in the smooth removal of dough 21 from the respective mold depression 4 and for dockering the molded dough piece for baking. Mounting holes 12 having bevelled edges 16 are shown in FIG. 1, and receive fastening elements for attaching body 1 to the rotating cutter.

FIG. 2 shows a side cross-sectional view of the mold taken along line 2—2 in FIG. 1. The elements shown in FIG. 2 have been discussed above with reference to FIG. 1. Raised intersecting ridges 10 and 11 are shown in FIG. 2 with ridge 10 being slightly higher than ridge 11. However, the relative heights can be equal or can be reversed, without departing from the scope of the invention. Additional ridges can also be provided at any location on raised surface 17, and can be at any desired angle to ridges 10, 11. Other shapes can be used instead of linear ridges, including circular, S-shaped, angled, dotted, dashed, or even flat-topped raised surfaces of planar extent less than that of raised surface 17.

FIG. 3 shows a sectional view taken along line 3—3 of FIG. 1. The elements shown are as discussed above. FIG. 3 illustrates the curved shape of the mold, suitable for mounting upon a rotating molder support cylinder surface (not shown). The bottom surface of depression 4 and raised surface 17 are similarly curved or arcuate, so as to produce generally planar surfaces in the molded products. While curved elements constructed for mounting upon a cylindrical rotor as described above permit convenient changes of the elements, for production purposes it is often preferred to engrave the mold cavities directly into a solid cylindrical rotor. The objects of the invention can be achieved by the use of any suitable rotary molding system which will mold base portions containing the type of recesses, grooves or the like which are required to retain the filling in the baked product.

FIG. 4 is a top elevational view of the egg treat product of the invention. Egg white portion 21 has the overall shape of the longitudinal cross-section of an egg. Egg yolk portion 22 rests in a depression in egg white portion 21 formed by operation of the rotary molder on dough 21, as discussed above.

FIG. 5 is a side view in section taken along line 5—5 in FIG. 4. FIG. 5 clearly shows the depression formed in egg white portion 21 in which egg yolk portion 22 is received.

Typically, 5 to 10 percent of the total weight of egg treat base 21 and egg yolk portion filling 22 is the filling portion before baking. The indentation in the base portion before the injection of the yolk portion includes in a preferred embodiment a grooved cross hatching pattern at the bottom of the indentation. The cross hatching pattern is formed by grooves 10, 11 of the mold. Upon heating, the yolk filling first flows into the grooves, and is then baked in place, thereby causing the yolk filling to lock itself into the base portion such that it adheres and is strongly bonded to the base portion. The filling is thus bonded to the base portion by a combination of effects including physico-chemical effects such as adhesion and the mechanical pressure of the baked surfaces pressing against each other. By a strong bond, it is meant that the strength of the bond between filling and base portion is at least as great as that of the baked base portion itself.

FIGS. 6 to 10 illustrate another embodiment of the invention, the production of dog-bone shaped biscuits having a longitudinal groove in the top surface thereof which can be filled with a filling or upper portion which is subsequently baked in place. Such biscuits can be prepared of any suitable dough, such as the doughs for hard and soft dog biscuits described above, and produced in any shape, provided at least one groove or depression is present for depositing the filling or upper portion. FIG. 6 is a top elevational view of a mold element 30 similar to those described above for the pet egg treat, for molding a dog-bone shaped biscuit with a longitudinal groove. Ridge 32, shown in FIG. 6 and the sectional views in FIGS. 7 and 8, imprints a longitudinal groove 42 in the molded product, shown in FIG. 10. Dockering pins or projections 34 are provided, serving the same functions as described above regarding FIGS. 1 to 5 and producing docker holes 40. Ridges 36 in mold element 30 imprint grooves 38 in the molded product, dividing the knobs from the shaft or main portion of the bone-shaped biscuit. Ridge 36 can be seen in FIGS. 6, 7, 8 and 9.

FIG. 10 shows the molded biscuit or dough piece unfilled for clarity, but in the process of the invention longitudinal groove 42 is at least partially filled with a filling or upper portion dough before the product is baked. As with the pet egg treat described in detail above, the result is a two-portion baked product with a filling or upper portion baked securely in place on the biscuit base portion. The filling can be essentially confined to the immediate vicinity of such a groove, or the filling or upper portion can cover all or a portion of the upper surface of the base portion, with the portion which is baked into the groove still serving to retain the two portions in place. This embodiment of the invention is representative of a general form of the baked product in which the base portion contains at least one groove or indentation in the top surface for deposit of the filling or upper portion. As described above for the pet egg treat, multiple grooves in various configurations can be used, either imprinted directly in the upper surface of the base portion as shown in FIG. 10 or in the bottom of a depression imprinted in the base portion, as shown in FIG. 5 for the egg treat.

Sugar, tallow, and water give the yolk portion a suitable fluidity, particularly when these ingredients are mixed with higher shear mixing devices such as an Eppenbach ® or Oakes ® mixer. These mixers quickly homogenize the ingredients, yielding a composition about the consistency of peanut butter, which is pumpable and ejectable. The low temperature setting and low residence time in the baking oven prevents the filling from prematurely setting before it has time to flow and fill the entire indentation. Furthermore, temperature sufficient to cause premature setting would also prevent the filling from interlocking with the base portion, including the grooves at the bottom of the indentation. Preferably, the viscosity of the yolk portion and the baking temperature are chosen so that the yolk first softens and flows into the grooves, then sets and bakes in place. The texture of the yolk portion can be varied from the texture of the base portion by introducing air into the yolk filling. Likewise, the base and filling can be of different colors, different sweetness levels, or any other contrasting properties, thus permitting the possible production of many varieties of products. For example, products with combinations of flavors such as steak and eggs, ham and eggs, poultry with onion filling and the like can be produced. In addition to the pet treat biscuits described as exemplary, numerous products for human consumption can be produced, including snack foods based upon filled biscuits, cookies containing fillings of bakable confectionary compositions or doughs of contrasting textures, flavors or colors, and the like. With both pet foods and items for human consumption, preferred embodiments include products whose shapes suggest their flavor and/or content, as with the pet egg treat—e.g., bone-shaped dog biscuits, fish shapes/flavors, poultry leg shapes/flavors, ham, steak, chops and the like, as well as fruit-shaped base portions with fruit-flavored fillings.

The flour is generally a blend of a hard flour and a medium flour in order to attain a stiff, but not inelastic, dough for the egg treat base portion. Any suitable flours which will produce stiff doughs compatible with rotary molding can be used, milled from grains including hard and soft wheats, corn, rye, barley and the like. The meal can be any one of the following plant or animal meals including, but not limited to, soybean meal, wheat meal, meat and bone meal, fish meal, poultry meal, oatmeal, rye meal, corn meal, rice meal, and barley meal. The coarser meals can be used in conjunction with flour to provide the desired texture as well as protein content, flavors and the like.

The various flavorings can be either liquid or dry type flavorings including powdered milk, salt, citric acid, calcium carbonate, MYF (which stands for Molasses Yeast Fermented solids) flavoring, inedible tallow (stabilized with BHA), ascorbic acid, meat, liver, bone marrow, poultry or fish flavorings, cheese and vegetable flavorings, among others. Various fruit or confectionary flavors can be used in cookies, tarts and similar confectionary products.

The minerals and vitamins generally may comprise any of such minerals as calcium, phosphate, etc. and a conventional commercially available vitamin mix. A dough conditioner is typically sodium metabisulfite to produce a more workable dough, used alone or in combination with preservatives. Egg portion 22 ingredients can include conventional, commercially available egg solids comprising commercially dried eggs or ground hard-boiled eggs. For products of the invention in which the flavor or content of egg are not to be emphasized at least a portion of the egg solids in the filling can be replaced by a heat-coagulable protein or gelatinizing component such as a modified starch or a vegetable gum. Such materials are included in the base portion dough and/or filling to provide the desired flow properties and baked texture as well as a nutritious component of the product. Any suitable heat-coagulable protein can be used, including various denatured proteins, egg solids as discussed above, and albumens from dairy, vegetable or fish sources. A suitable soy albumen is available from the Gunther Company (a subsidiary of General Mills) and dairy albumen is typically recovered from the whey fraction of milk. Suitable vegetable gums, modified starches and gelatins can also be used to substitute for a portion of the egg solids by functioning as a gelatinizing agent. Generally, any suitable sugar can be used in the various products within the scope of the invention as desired, to produce sweetening and viscosity effects. Thus, "a sugar" as used in the filling and/or base portion dough of the products (e.g., where at least one cookie dough is used) can be at least one of the normal sugars used in foodstuffs, such as sucrose, fructose, dextrose, corn syrups and the like. However, the presence of some sugars in fillings or doughs containing egg solids contributes to browning during baking, presumably due to the Maillard reaction. This may not be desirable in products such as the egg treat.

In order for the egg yolk portion to be extrudable, it must have sufficiently low viscosity. A sugar provides the necessary viscosity and aids in uniform spreading of the filling to obtain a final egg treat which is somewhat planar. The sugar to water ratio is important because the sugar helps bind the yolk portion of the egg portion and because the sugar to water ratio affects the extrudability and the viscosity of the egg yolk portion. The sugar content is preferably between about 5 percent to about 20 percent. A proportion higher than 20 percent wherein too much sugar is present causes browning. A proportion lower than about 5 percent causes poor bonding between the yolk and base portion due to the lack of sugar, and may cause short shelf life due to excessive water. Because the egg white portion is desired to be white, the use of most sugars is impractical. For example, if dextrose or fructose is employed, such sugars cause browning upon baking. Corn syrup does not produce a sufficiently low viscosity. Accordingly, only sucrose simultaneously produces the desired viscosity and prevents browning of the egg white portion in this egg treat embodiment.

The sugar normally employed in products containing egg solids is preferably a non-reducing sugar such as sucrose sugar. It has been found that fructose and dextrose cause the egg treat to brown when baking when employed in the yolk filling. Corn syrup normally does not produce a sufficiently low viscosity nor the binding action necessary to bind yolk filling portion 22 to base portion 21. Accordingly, sucrose, which does not brown upon baking to the extent that dextrose and fructose do, is the most practical and economically useful sugar. In egg yolk portion 22 filling, various coloring agents can be employed such as titanium dioxide, carotenoid, or any other conventional coloring agents. The sucrose sugar is generally a finely ground sugar. A coarser sugar is not desirable, but still can be used, because from the practical standpoint, the quick solubility of the finer sugar shortens the preparation time and would result in lower production costs. Yolk portion 22 may, if desired, extend substantially above the surface of base portion 21, especially if such a filling is injected into a shallow recess in the base portion or applied to a base portion in which the grooves are imprinted in the flush top surface. In certain embodiments, e.g., confectionary products, a high melting point fat such as a stearine, a stearate or commercial "hard flakes" can be included in the filling to provide suitable flow properties when the filling is heated, with at least partial hardening taking place upon cooling.

In an embodiment of the invention, a multi-colored or multi-flavored cookie or a dual or multi-textured cookie can be produced by molding a base portion of a cookie dough and applying a filling or upper layer of a dissimilar filler cookie dough. The dissimilar cookie dough can contain a humectant for imparting a softer texture to the filler portion. Suitable soft cookie doughs which may be used are disclosed in U.S. Pat. No. 4,444,799, herein incorporated by reference in its entirety. The filling or dough can be applied to the flush top surface of the base portion or injected into a recess as before, provided that at least one groove is provided for the filling to flow into so that the two portions adhere and bond together when baked. Any suitable combination of cookie doughs can be used, provided that the filler dough can penetrate the grooves in the base portion and the doughs will bake together to the desired texture. The filler dough and the base cookie dough can each contain the same or different particulate flavoring ingredients. If desired, the base portion with the filling or second layer applied can be subjected to compressive action from a set of rollers or a press to force the filling into the recess and/or grooves before baking.

In certain embodiments of the invention, the product (i.e., the base portion with filling) is at least partially covered with a coating or glaze and then baked so that at least a portion of the surface is covered with a continuous solid coating. Coating formulations can be chosen which will bake into coatings with surface consistencies ranging from hard to soft, but preferably not sticky. Such coatings can be opaque, translucent or even transparent. Such coatings can be used to protect the product from moisture and friction during handling and storage, and to provide additional bonding of the filling and base portion. Additional flavors such as meat, liver, fish and the like can be imparted by the coatings, and they can provide a glaze or glossy surface which enhances the appearance of the product. The coating can be applied in a liquid form to the unbaked or partly baked product by any suitable method, preferably by a method achieving relatively complete coverage, such as enrobing.

Various formulations known in the art, such as glazes comprising sugar and/or starch and proteinaceous compositions, can be used depending upon the nature of the product and the object of applying the coating. Presently preferred for the pet treat embodiments of the invention are formulations comprising meat or fish solids, gelatin, modified starches, gums and saccharides.

The following non-limiting example illustrates the invention:

EXAMPLE

The egg treat base portion comprises 43.38 percent of flour, 13.23 percent of meal, 2.81 percent of flavoring, 0.41 percent vitamin and mineral premix, 0.04 percent preservative, 12.08 percent egg and 28.5 percent of water. The percentages are all based upon weight and total approximately 100 percent of the base portion of the egg treat. All the ingredients, except the water, are mixed at room temperature in a mixer for a sufficient time to obtain a uniform mixture. Hot tap water is added to the dry blended mixture and mixing is continued until a uniform mixture is obtained and results in a stiff dough. The base filling is molded into an egg shape by a rotary molder. Dough 21 is molded and an indentation is then made on the upper surface of dough 21 with grooves 10, 11 forming a cross hatched pattern in the bottom surface of the indentation.

The egg treat yolk filling portion comprises 21.41 percent of flour, 5.60 percent of meal, 3.24 percent of flavoring, 0.27 percent of vitamin and mineral premix, 15.55 percent of sugar (sucrose), 1.11 percent of coloring agents, zero to 0.01 percent of preservative, 16.28 percent of egg solids and 36.53 percent of water. Preservatives are not usually used or needed. These percentages of ingredients are based upon weight and comprise 100 percent of the filling. All of the ingredients, except water, are mixed at room temperature to obtain a uniform mixture. Cold tap water is then added to the dry blend mixture and mixing is continued until a consistent mixture is obtained to form a stiff filling having a peanut butter-like consistency and viscosity. The mixing is accomplished in a high speed Oakes $^R$ mixer. The yolk filling is then extruded through a band depositor having multiple nozzles into the indentations of base portion 21 which is discussed above. Then the egg treat product is baked at a temperature of about 200° to 600° F for about 5 to 15 minutes. Drying occurs at about 200° to 325° F. for about 12 to 25 minutes, in a forced air dryer including about a 7 minute retention time in the oven. This reduces the weight of the egg product by approximately 25 percent. The weight reduction is due to loss of moisture; the final product then has a moisture content of approximately 11 percent.

Although in the preferred embodiment a depression is formed on the egg white portion 21, a raised area can be provided instead. That is, surface 17 formed on the egg white portion can in the alternative embodiment, be raised above the remaining areas of egg portion 21 and still retain the function of assisting in the attachment of egg yolk portion 22.

The improved baked goods of the invention are capable of achieving the above-enumerated advantages, and while preferred embodiments of the invention have been disclosed, it will be understood that it is not limited thereto but can be otherwise embodied within the scope of the following claims.

What is claimed is:

1. A baked product comprising a base portion formed in a predetermined shape from a dough comprising flour, meal, and at least one flavor, and an upper portion or filling adhered and bonded thereto, said upper portion or filling comprising flour, meal, at least one flavor, a sugar and a heat-coagulable protein or gelatinizing component, wherein said base portion has at least one groove or indentation in the upper surface thereof and at least a portion of said upper portion or filling has been baked into said groove or indentation to adhere and bond the portions together.

2. The baked product as claimed in claim 1 wherein said base portion is formed form a dough comprising water add dry ingredients comprising from 40 to 50 weight percent of flour, from 10 to 20 weight percent of meal, and from 0 to 15 weight percent of egg solids, and said upper portion is formed from a dough comprising from 15 to 25 weight percent of flour, from 4 to 8 weight percent of meal, from 2 to 18 weight percent of a sugar and from 5 to 20 weight percent of a heat-coagulable protein or gelatinizing component.

3. The baked product as claimed in claim 2 having a baked-on coating or glaze.

4. The baked product as claimed in claim 1 wherein said heat-coagulable protein comprises egg solids.

5. The baked product as claimed in claim 1 having a baked-on coating or glaze.

6. The baked product as claimed in claim 1 wherein said predetermined shape is suggestive of at least one of the contents and flavors of said base portion and said filling of said product.

7. The baked product as claimed in claim 6 wherein said base portion has the shape of a dog bone and said filling contains bone marrow.

8. The baked product as claimed in claim 7 wherein said base portion is formed from a dough used for the production of a hard or soft dog biscuit.

9. The baked product as claimed in claim 6 wherein said base portion has the shape of a cross-section of a fruit and said filling contains at least one fruit flavor.

10. The baked product as claimed in claim 1 wherein said base portion and said upper portion are each cookie doughs of differing textures, flavors or colors.

11. An egg treat biscuit for pets, including:
 (a) an edible base portion formed from a dough comprising flour, meal, flavoring, vitamins and minerals, egg solids and water, said base portion having a lower surface and an upper surface, with a depression formed in said upper surface; and
 (b) an upper portion or filling formed by depositing in said depression in the upper surface of said base portion a dough comprising flour, meal, flavoring, vitamins, minerals, sugar, coloring, egg solids and water, wherein said base portion and said upper portion are fixedly attached by baking to adhere and bond the upper and base portions together.

12. An egg treat biscuit as claimed in claim 11, wherein said base portion has a substantially planar bottom surface and a substantially planar upper surface which is substantially parallel thereto, said base portion has an oblate ellipsoidal shape, said depression is generally circular in shape, and said upper portion is yellow in color, whereby the baked egg treat biscuit has the appearance of a sliced hard-boiled egg.

13. An egg treat biscuit as claimed in claim 12, wherein said depression in said base portion has a surface which is substantially planar and substantially parallel to the bottom surface of said base portion, and has at least one groove formed therein, whereby said upper portion or filling is received in said at least one groove and baked therein to form a stronger bond between said upper portion and said base portion in the baked egg treat biscuit.

14. An egg treat biscuit as claimed in claim 12, wherein said base portion has a color in the range form bone white to tan to further simulate the appearance of a sliced hard boiled egg.

15. A dry hard pet egg treat biscuit having a base egg white portion and upper egg yolk portion, said base egg white portion being formed in an oblate ellipsoidal shape from a dough comprising 40 to 50 weight percent of flour, 10 to 20 weight percent of meal and from 10 to 15 weight percent of egg solids and said egg yolk portion comprising from 15 to 25 weight percent of flour, 4 to 8 weight percent of meal, from 12 to 18 weight percent of a sugar and from 15 to 20 weight percent egg solids, wherein said base portion has a substantially planar lower surface and a substantially planar upper surface having an indentation therein, said indentation having a substantially planar lower surface therein containing a plurality of grooves into which said upper egg yolk portion is deposited so that the base egg white portion and said egg yolk portion adhere and bond together when the biscuit is baked.

* * * * *